United States Patent [19]
Johnson

[11] 3,771,216
[45] Nov. 13, 1973

[54] METHOD AND TOOLING FOR EXTRUDING A CLOSED END RIVET

[75] Inventor: Verner A. Johnson, Livonia, Mich.

[73] Assignee: Johnson Die & Engineering Co., Detroit, Mich.

[22] Filed: Oct. 27, 1971

[21] Appl. No.: 193,075

[52] U.S. Cl............ 29/509, 29/243.53, 29/522, 113/1 M, 113/1 R, 113/116 FF, 113/121 C, 287/189.36 D
[51] Int. Cl........... B21d 39/00, B23p 11/00
[58] Field of Search............ 29/509, 522, 505, 29/521, 243.53; 113/116 FF, 1 M, 1 F, 1 R, 121 C; 287/189.36 D

[56] References Cited
UNITED STATES PATENTS

| | | | |
|---|---|---|---|
| 3,198,155 | 8/1965 | Fraze | 29/509 X |
| 3,357,388 | 12/1967 | Dunn | 29/509 X |
| 3,359,935 | 12/1967 | Rosbottom | 113/1 R |
| 3,451,367 | 6/1969 | Henrickson | 113/121 C |
| 3,570,554 | 3/1971 | Kabel | 29/509 X |
| 3,579,809 | 5/1971 | Wolf | 29/509 |

*Primary Examiner*—Charlie T. Moon
*Attorney*—Benjamin W. Colman

[57] ABSTRACT

An assembly of two layers of metallic material conjoined in a single machine operation extruding a closed end (blind hole) rivet in one layer simultaneously with an engaging socket in the second layer is disclosed. The extruded rivet is substantially in the form of a cup with a flanged bottom seated and secured within the socket recess of the second layer formed simultaneously therewith. The inventive tooling and process to form the assembly in a single machine operation is also disclosed.

6 Claims, 4 Drawing Figures

INVENTOR.
VERNER A. JOHNSON

ATTORNEY

METHOD AND TOOLING FOR EXTRUDING A CLOSED END RIVET

The invention relates to a system for producing a conjunctive assembly of two flat layer portions of metallic material in a single extrusion operation, in which an extrude punch drives aligned overlying layer portions into a die cavity and against a yieldingly resistant anvil to form a blind hole rivet body having a laterally extending bottom flange seated and secured within a socket recess of the second layer portion. PortionS of both layers are simultaneously driven into conjunctive relationship by impelling the extrude punch, which has a forwardly projecting convexly curved end face, into a first layer portion and against a second layer portion immediately thereunder, driving both layer portions into a die cavity against a yieldingly resistant extrude anvil, axially aligned with the extrude punch, and having a distal end face in bearing contact with the second layer portion of a form such that the impelled portions of the two layers are spread axially and laterally in the die davity upon the forwardly projecting convexly curved end face of the anvil, causing the second layer portion to take socket form and the first layer portion to take a flanged bottom form within the socket area of the second layer portion. The convexly curved end faces of the extrude punch and extrude anvil are axially aligned and in opposed relationship.

When extruded, the rivet body formed in the first layer portion, i.e., the layer portion first struck and entered by the extrude punch, is provided with a concavely curved depression in the base of the punch cavity. The exterior bottom surface of the second layer portion, axially aligned with the rivet body, is also provided with a concavely curved depression, complementary with the convex curvature of the end face of the extrude anvil. The flange and socket formation of the conjoined first and second layer portions result directly from the flow of metal impelled by the projecting convexly curved end faces of the aligned extrude punch and anvil moving relatively to each other in the die cavity. The yieldingly resistant anvil permits elongation of the rivet body formed in the first layer portion, and the measure of the resistance determines the relative thickness of the base of the rivet body in the first layer and of the socket portion in the second layer.

The metallic materials to which the invention can be applied include hot and cold rolled steels, preferably in but not limited to sheet or coil form, of relatively low carbon content, as for example grades 1009, 1010, and 1020 with any finish, stainless steel grades which have been spherodized annealled, most grades of brass, copper, aluminum of extrusion quality, and other metals in alloy or composition grades which qualify for cold formed extrusions.

At the present time, the economics of metal layer processing and assembly are such that reduction in cost is a prime necessity, demanding special and inventive working of the metals. The elimination of the more expensive individual rivets, requiring that they be separately applied and located one by one in the layers of metal to be conjoined before peening or staking, is a most desirable and necessary goal. The invention hereindisclosed meets that goal.

The tooling and process by which the extruded rivet form and socket are produced and conjoined, in a single machine operation, form parts of the invention disclosed herein. The tooling herein disclosed is related in concept to the tooling disclosed in our copending patent application Ser. No. 193,079, filed of even date, for "Metal Layer Rivet Form, Assembly and Process," but differs therefrom in material structural features. The process, by which the one-step formation and assembly are achieved, also differs materially from the aforesaid copending disclosure.

The tooling of the instant invention involves the cooperating extrude punch and anvil placed about two layers of metallic material, of extrusion grade and quality, which are deformed simultaneously by the complementary tooling to extrude a blind hole rivet form in one layer into a complementary socket in the second layer, conjoining the two layers. This operation is performed in a single step. The conjunctive formation secures the two layers in assembled relationship.

It is an object of the invention to produce an assembly of two layers of metallic material by a single machine operation. Another object is to provide, by such single operation, an extruded rivet form and socket assembly in two adjacent overlying layers of metal. A further object is to extrude a rivet form having a bottom flange extending laterally of the rivet body, in a single machine operation. Still another object is to extrude a socket recess complementary to the aforesaid flanged rivet body, simultaneously therewith, in a single operation, whereby the extruded layers are conjoined and secured firmly together. Yet another object is to provide tooling means for producing the aforesaid conjunctive rivet form and socket assembly in a single machine operation, whereby a conjunction of the metal layers can be more economically effected.

Various further and more specific objects, features and advantages of the invention will appear from the description given below, taken in connection with the accompanying drawings, illustrating by way of example a preferred form of the invention. Reference is here made to the drawings annexed hereto and forming an integral part of this specification, in which FIG. 1 is a vertical sectional view of two metal layers conjoined by the inventive rivet and scoket form.

Figure 1:
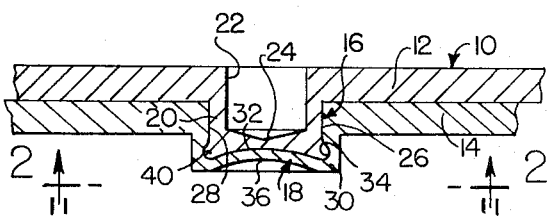
Figure 2:
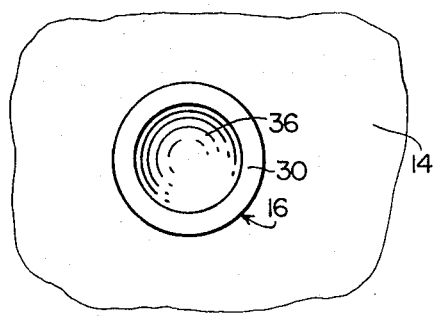
FIG. 2 is a bottom plan view taken substantially on the line 2—2 of FIG. 1.
Figure 4:
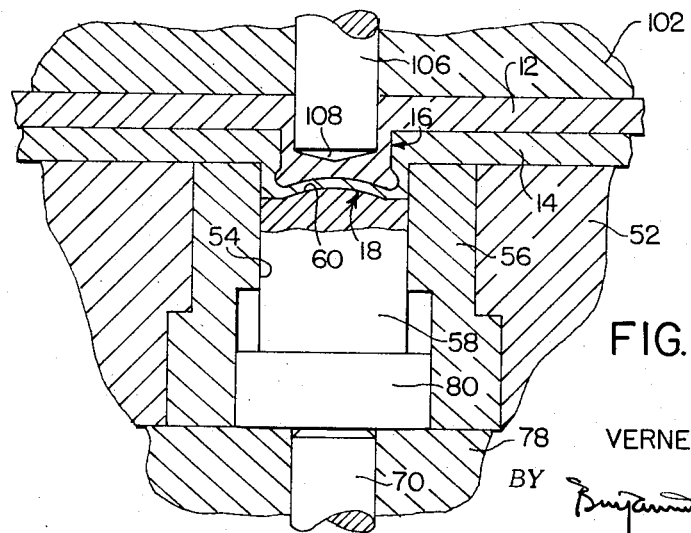
FIG. 4 is a fragmentary slightly enlarged vertical sectional view of the tooling at the end of the extrusion stroke.

As illustrated particularly in FIGS. 1 and 2, the metallic layer assembly 10 comprises the base or first layer 12, the assembled second layer 14 secured together by the extruded rivet form 16 of the first layer in the extruded socket form 18 of the second layer.

The rivet form 16 comprises the extruded body portion 20 defining the extrude punch cavity 22 with its concavely formed base 24. The outer wall surface 26 of the rivet body is closely seated in the socket cavity 28 of the second layer 14.

The socket form 18 comprises the extruded body portion 30 having the convexly-concavely curved base 32, the annular recess 34 and the base depression or concavity 36. The rivet body bottom flange 40, extending laterally and outwardly of the body 20, is seated in the socket recess 34, conjoining and securing the base layer 12 and the second layer 14 together.

Figure 3:
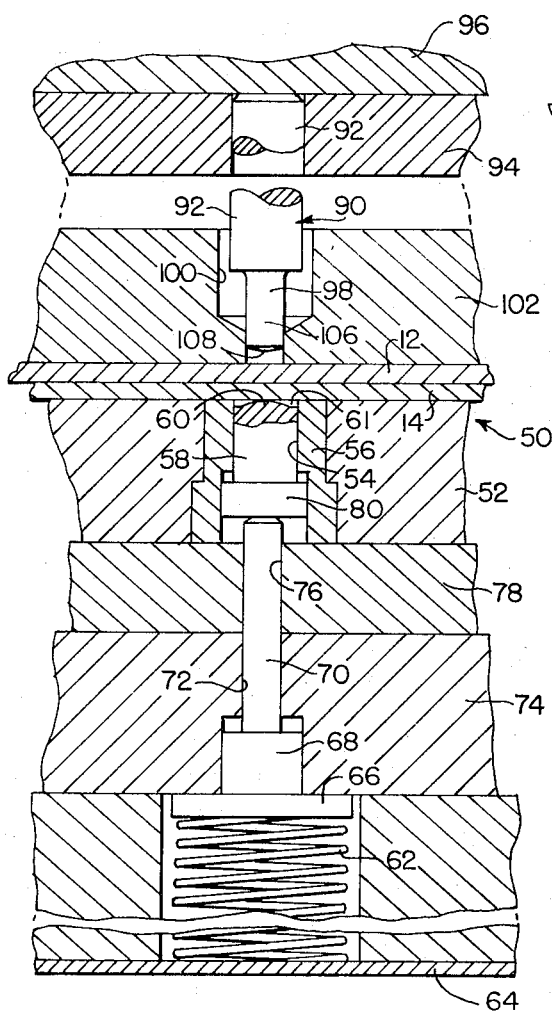
FIG. 3 is a vertical sectional view of tooling to extrude the conjunctive rivet and socket form.

The tooling 50 to secure the aforesaid assembly 10 comprises the following elements, reference being made particularly to FIGS. 2 and 3 of the drawing. The base or first layer 12 and the second layer 14 are placed upon the button retainer 52 and over the die cavity 54 of the extrude button 56. The extrude anvil 58 having the convexly curved highly polished crown end face surface 60, forming the anvil cavity 61, is slidingly disposed in the die cavity 54 immediately adjacent the under side of the second sheet 14, being biased thereto and thereagainst by the spring 62 supported upon the lower die shoe 64 and bearing upwardly against the spacer disc 66, the pin base 68, the pressure pin 70 axially movable in the opening 72 of the die block 74 and in the opening 76 of the backing plate 78 under the button retainer 52 and the extrude button 56, the distal end of the pressure pin 70 bearing against the base flange 80 of the extrude anvil 58.

The extrude punch 90 has its shank 92 secured in the punch retainer 94 under the backing plate 96 and the upper die shoe (not shown). The extrude punch portion 98 is disposed in the counterbore and countersunk opening 100 of the stripper 102 that bears upon the upper side of the first layer 12 during the extrusion operation. The extrude punch portion 98 terminates at its distal end in a tapered chamfer section 104 and the extrude pin portion 106 having a convexly curved highly polished crown end face 108 axially aligned with and in opposing relationship to the end face 60 of the extrude anvil 58.

Before the convexly curved tip 108 and the punch pin portion 106 of the extrude punch are lowered, strike and enter the first layer 12 and deform the second layer 14, the convexly curved end face 60 of the extrude anvil 58 normally bears on the underside of the sheet 14, being biased thereagainst by the spring 62. As the extrude punch pin portion and end face enter the first layer 12, the extrude anvil 58 is yieldingly moved in the die cavity 54 while resisting such movement. Thus, the two layers of metal 12 and 14 are being compressed against each other while being extruded into the die cavity 54, effecting a stretching of the first and second layers into the rivet form 16 and socket form 18. The compressive relationship between the extrude punch pin portion 106 and the extrude anvil 58 cause the extruded elongated rivet body 20 and the socket body 30 to flow into the anvil cavity 61, between the anvil end face 60 and the underside of the second sheet 14, to fill that cavity and conform the socket 18 to its surface configuration. The flow of metal into the rivet body 20 during the extrusion-compression operation produces the flange 40 at the bottom of the rivet body and the socket recess 34 in the socket body 30, by virtue of the convex curvature of the extrude punch and anvil end faces. Such lateral flow of the two layers of metal in the die cavity 54 provides the unexpected conjunction of the rivet body flange 40 in the socket recess 34, whereby the two layers 12 and 14 are positively secured together.

It is important during the extrusion operation that the stretched areas of the first and second layers forming the rivet form and socket 16 and 18 respectively are not pierced, perforated or destroyed by undue elongation. A sound and sufficient wall thickness in the rivet body 20 and the socket body 30 should always be maintained to provide the required conjunctive assembly having the physical characteristics required for any particular application. Sufficient metal must, however, be displaced to provide the rivet and socket form combination hereindisclosed.

The rivet form 16 is structurally a blind hole rivet, as is the socket form 18. If desired or required, a hole can be pierced by a secondary operation through the bottom walls of the rivet and socket forms without destroying the conjunctive assembly of the two layers. Such operation is of course merely optional, and does not in any way limit the inventive combination hereindisclosed and claimed. Normally, it does not seem to be required.

It has been established that the economics of the inventive method and construction hereindisclosed result in a very substantial saving over conventional riveting assembly operations heretofore and currently used. This economic advantage is supplemented by a very positive conjunction of the two layers of metal, equal or superior to the assembly values of conventional riveting practice.

In this specification, reference has been made to low carbon "soft steels," stainless steel, copper, aluminum and other metallic materials having extrusion elongation factors or characteristics permitting formation of the rivet and socket forms and assemblies hereindescribed and illustrated. It will be understood that the metals referred to do not comprise the entire list of metallic materials to which the invention is applicable, and that such list of metals is not to be considered a limitation upon the application or utilization of the invention.

Although the highly polished crown end face 108 of the extrude punch 90 has been illustrated and described as a tapered face, and the highly polished crown end face 60 of the extrude anvil 58 has been illustrated and described as being convexly curved, it is to be understood that such curvature may take other similar forms including such surface configurations as have a plurality of flat surfaces at an angle to each other, as in a decahedron, dodecahedron or similar multi-faceted solid surface.

The end faces of the extrude punch and anvil, whatever form they may take, must be highly polished and smooth in order to obtain the requisite flow of metal that produces the elongated rivet form 16. The crown configuration of the polished extrude punch and anvil end faces is related to the hardness of the sheet material being deformed. The harder the sheet material, the more crown is required in order to improve the flow of metal across the faces of the extrude punch and anvil.

The upward pressure of the spring 62 is directly related to the spread and flow of metal between the extrude punch and anvil as these tools are moving downwardly and before the base flange 80 of the extrude anvil bottoms on the backing plate 78. Persons skilled in the art of tool and die fabrication and their usage will be able to determine these values with relative ease and little experimentation.

Although certain particular embodiments of the invention are hereindisclosed for purposes of explanation, further modifications thereof, after study of this specification, will become apparent to those skilled in the art to which the invention pertains. Reference should be had to the appended claims in determining the scope of the invention.

We claim:

1. Tooling to cold extrude conjoined rivet and socket forms in and from two contiguous layers of metallic material, comprising an extrude punch having a highly polished crowned distal end face, punch support means adapted to impel said punch end face into a first layer portion and the contiguous portion of the second layer, a die adapted to receive said layer portions extruded thereinto by said extrude punch, an extrude anvil slidingly movable in said die and having a highly polished crowned distal end face adapted to yieldingly resist movement of said extruded layer portions in said die, and means supporting said extrude anvil for sliding yieldingly resistant movement in said die, said extrude punch adapted to force said first layer portion into said contiguous second layer portion across said crowned distal end face of said yieldingly resistant anvil, said punch and anvil crowned end faces being axially aligned and in opposing crown relationship.

2. The tooling defined in claim 1, wherein
said extrude punch and anvil end faces are convexly crowned.

3. The tooling defined in claim 1, wherein
said extrude punch and anvil end faces are conically crowned.

4. The process of cold extruding a conjoined rivet and socket form in two contiguous metal layer portions comprising the steps of 1. disposing two contiguous metal layer portions over a die cavity between an extrude punch and a yieldingly resistant extrude anvil, said extrude punch having a distal projecting highly polished crowned end face disposed adjacent one side of a first layer portion, said extrude anvil being axially aligned in said die cavity with said extrude punch and having a distal projecting highly polished crowned end face placed adjacent the underside of the second layer portion, said end faces being aligned and in opposing crowned relationship about said two layer portions therebetween, 2. striking and entering said first layer portion with the extrusion crowned end of said extrude punch to force said first layer portion into said second layer portion and both portions into said die cavity and upon said yieldingly resistant anvil crowned end face, 3. forcing said first and second layer portions to flow and spread simultaneously across the crowned anvil end face to the outer recesses of said die cavity thereabout against the yielding resistance of said anvil, 4. and spreading said first layer portion at its base into a substantially annular flange within a recess formed in said second layer portion at its base, as said two layer portions flow and spread across said crowned anvil end face, into a conjoined rivet and socket form in said two layer portions.

5. The process defined in claim 4, wherein
said two layer portions are struck and entered by an extrude punch having a convexly crowned end face.

6. The process defined in claim 4, wherein
said two layer portions are forced into said die cavity against an extrude anvil having a convexly crowned end face.

* * * * *

Disclaimer 3,771,216.—*Verner A. Johnson*, Livonia, Mich. METHOD AND TOOLING FOR EXTRUDING A CLOSED END RIVET. Patent dated Nov. 13, 1973. Disclaimer filed Nov. 23, 1973, by the assignee, *Johnson Die & Engineering Co.*

Hereby disclaims the portion of the term of said patent subsequent to May 8, 1990.

[*Official Gazette March 12, 1974.*]